United States Patent [19]

Nelson

[11] 4,445,567
[45] May 1, 1984

[54] THERMOSTAT FOR CONTROL OF AN ADD-ON HEAT PUMP SYSTEM

[75] Inventor: Lorne W. Nelson, Bloomington, Minn.

[73] Assignee: Honeywell Inc., Minneapolis, Minn.

[21] Appl. No.: 352,669

[22] Filed: Feb. 26, 1982

[51] Int. Cl.³ ............................................. F25B 29/00
[52] U.S. Cl. ..................................... 165/29; 236/1 E; 236/47; 236/78 B; 237/2 B
[58] Field of Search ..................... 165/29; 62/160, 175, 62/238.7, 324.1, 332; 126/427; 236/1 ER, 47, 78 B, 80 C; 237/2 B

[56] References Cited

U.S. PATENT DOCUMENTS

| | | | |
|---|---|---|---|
| 3,050,610 | 8/1962 | Osen | 236/1 ER |
| 3,113,439 | 12/1963 | Eargle . | |
| 3,183,965 | 5/1965 | Moakley, Jr. . | |
| 3,191,399 | 6/1965 | Stewart . | |
| 3,373,800 | 3/1968 | Ferdelman | 165/29 |
| 3,381,489 | 5/1968 | Biehn et al. . | |
| 3,537,509 | 11/1970 | Ferdelman | 165/29 |
| 3,731,497 | 5/1973 | Ewing . | |
| 3,993,121 | 11/1976 | Medlin et al. . | |
| 3,996,998 | 12/1976 | Garst et al. . | |
| 4,102,390 | 7/1978 | Harnish et al. . | |
| 4,143,707 | 3/1979 | Lewis et al. . | |
| 4,147,203 | 4/1979 | Rayfield | 165/29 |
| 4,158,383 | 6/1979 | Rayfield . | |
| 4,179,894 | 12/1979 | Hughes . | |
| 4,191,023 | 3/1980 | Sisk et al. . | |
| 4,231,352 | 11/1980 | Bowden et al. | 165/29 |
| 4,269,261 | 5/1981 | Kountz et al. . | |
| 4,311,190 | 1/1982 | Walley | 165/29 |
| 4,373,350 | 2/1983 | Noland | 165/29 |

FOREIGN PATENT DOCUMENTS

EP 7497 2/1980 European Pat. Off. ............. 165/29

Primary Examiner—William R. Cline
Assistant Examiner—John M. Kramer
Attorney, Agent, or Firm—Alfred N. Feldman

[57] ABSTRACT

A two-stage thermostat means for an add-on heat pump installation provides separated control of a furnace and a heat pump. The two-stage thermostat means utilizes a single pole, single throw switch means, and a single pole, double throw switch means to properly stage and control a heat pump and a fossil fueled furnace so that they do not overlap. The control of the temperature of the heated area is independent of any need to connect a circuit between the thermostat in the heated area and any type of thermostat at the heat pump itself.

10 Claims, 2 Drawing Figures

THERMOSTAT FOR CONTROL OF AN ADD-ON HEAT PUMP SYSTEM

BACKGROUND OF THE INVENTION

The use of add-on heat pump systems is becoming popular. The use is in the area where retrofit applications of heat pumps replace faulty air conditioning units with the heat pump supplying cooling during the summer and a first stage of heating during the winter. The second stage of heating use the existing fossil fuel type of furnace. This system would operate in a cost attractive manner in geographical locations where the ratio of electricity cost to fossil fuel cost is relatively low. Operating the heat pump with a high coefficient of performance during mild weather means a lower heating bill during those times.

With an add-on heat pump system, the indoor coil is normally located in a warm air furnace plenum. This means that the fossil fuel furnace must be turned off when the heat pump is operating. The failure to turn off the heat pump when the furnace is operating can cause severe damage to the heat pump equipment located downstream of the warm air furnace as the heat from the warm air furnace combined with the heat from the heat pump exceeds the design limits for the heat pump coil.

Today there are two basic strategies for controlling these add-on heat pump type systems. An outside thermostat setpoint dictates which system should be operational from the space thermostat. The heat pump is operated above the setpoint and the fossil fuel furnace operated below the setpoint. The setpoint of the outdoor thermostat in this case would be adjusted to represent the balance point of the heating requirements of the house and output capacity of the heat pump. Also, these types of add-on heat pump systems have been operated with two-stage thermostats used in conjunction with system logic controls (relay panels, duct thermostats, etc.) to achieve the proper sequence of operation between the heat pump and the fossil fuel furnace.

Because of the varying internal loads, the variations in outdoor temperature, the variation in solar effects, etc. the balance point of a house is continually changing. Therefore, an outdoor thermostat controlling changeover must be set for the worst case, and the actual saving is less than optimum. The conventional two-stage thermostat control approach requires additional logic to test whether the heat pump has the capacity to heat the house during cool outdoor weather. Without this type of test, once the thermostat starts to operate the second stage fossil fuel furnace it would continue to cycle the furnace without reverting back to the heat pump when outdoor temperatures would allow this type of operation in a more economical manner. A drawback of the conventional two-stage thermostat for this application is that during normal morning pickup, the second stage would be initially energized and the fossil fuel furnace would operate to pick up the space even though in warm weather that might not be necessary. Therefore, the more efficient heat pump would not be utilized.

DESCRIPTION OF THE INVENTION

The present invention utilizes a two-stage type of thermostat wherein the first stage has a relatively narrow temperature control range as compared to a second stage. With the first stage having a relatively narrow temperature range and the second stage having a wider temperature range, two different types of switching actions can be accomplished and these switching actions can be programmed in a simple thermostat structure to ensure that two critical functions are provided. The first critical function is that the heat pump and the fossil fuel furnace are mutually exclusive in their operation. Thus, the furnace cannot overlap the heat pump operation and damage the heat pump installation. The second feature is that the thermostat is automatically programmed so that the heat pump is restored to operation when the outside temperature allows for the heat pump alone to handle the heating load on the building.

The present invention is accomplished by a two-stage thermostat that has a first stage with a relatively narrow control range of temperature and which includes a single pole, single throw type of switch. This switch is connected in an internal thermostat circuit to a second stage switch means which is a single pole, double throw type of switch. The staging of the two switches automatically takes care of the restoration of the heat pump to operation when the outdoor balance point of the system has been reached so that the heat pump alone is capable of handling the load.

DESCRIPTION OF THE PREFERRED EMBODIMENT

Figure 1:
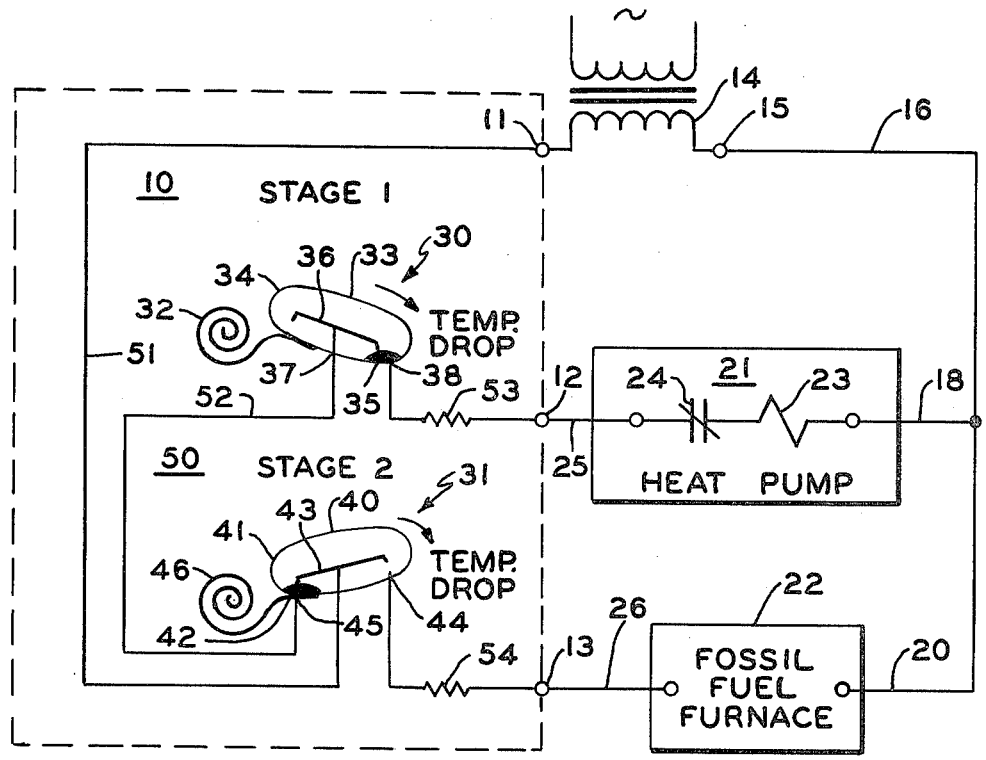
FIG. 1 is a schematic diagram of the thermostat connected to a heat pump and a fossil fuel furnace.

In FIG. 1 there is disclosed a thermostat means 10 having three terminals 11, 12, and 13 by which the thermostat means 10 can be connected to a source of power disclosed at 14 as a conventional step-down transformer. The step-down transformer 14 normally would have an output voltage of approximately 24 volts. The transformer 14 would be connected through a terminal 15 to conductor 16 which in turn is connected at conductors 18 and 20 to a heat pump disclosed at 21 and a fossil fuel furnace disclosed at 22. The heat pump 21 has an internal control relay 23 that is used to operate the heat pump, and a pair of normally closed contacts 24 which typically would be the outside economy balance point control. The heat pump 21 would be further connected by a conductor 25 to the terminal 12 of the thermostat means 10 while the fossil fuel furnace 22 would be connected by a conductor 26 to the terminal 13 of the thermostat means 10. All of the equipment to the right of the terminals 11, 12, and 13 are conventional items to which the thermostat means 10 is adapted to be connected.

The thermostat means 10 has two stages. The first stage is generally disclosed at 30, while the second stage is generally disclosed at 31. The first stage includes a bimetal means 32 that mounts and pivots a single pole, single throw mercury switch disclosed at 33. The mercury switch has an envelope 34 and mercury 35 that is capable of flowing within the envelope 34. The mercury switch 33 has an internal contact structure 36 and has two output conductors 37 and 38. The bimetal means 32 and the mercury switch 33 are of conventional design and are operated in a relatively narrow temperature range so that the first stage 30 can control within a more limited temperature range than the temperature range of the second stage 31.

The second stage 31 includes a single pole, double throw mercury switch 40 that includes an envelope 41 and mercury 42. The internal structure provides a contact means 43 and a pair of output conductors 44 and 45. The envelope 41 is supported and operated by a bimetal means 46 in a conventional manner. The temperature drop direction of the stages 30 and 31 is shown by an arrow.

The internal thermostat circuit means is generally disclosed at 50 and includes a conductor 51 that connects the terminal 11 to the central electrode element 43 of the mercury switch 40. The internal thermostat circuit means 50 further includes a conductor 52 that connects the conductor 37 to the conductor 45 to interconnect the first and second stage switch means 33 and 40. The internal thermostat circuit means 50 is completed by a pair of heat anticipators 53 and 54 (which form a heat anticipation means) that are connected between the terminal 12 and conductor 38, and terminal 13 and conductor 44. The heat anticipators 53 and 54 typically would be ordinary resistors which generate heat when current flows through them.

Figure 2:
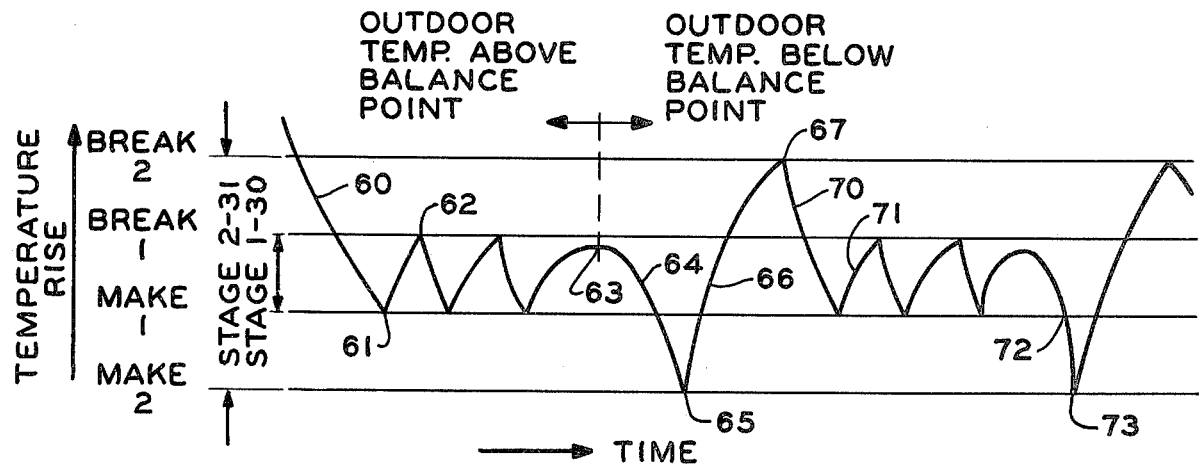
FIG. 2 is a graph of time versus the make and break temperatures of the thermostat means.

In FIG. 2 there is a temperature versus time graph of the thermostat means 10 of FIG. 1 showing the operation of the system in various types of situations. The stage 1 of the thermostat means 10 is disclosed at 30, and is shown to be of a relatively narrow range compared to the stage 2 portion of the thermostat as disclosed at 31. The make and break points of each of the thermostat stages is shown. The Break 1 and Make 1 lines indicate the limits of operation of the stage 1 portion of the thermostat, while the Make 2 and Break 2 lines indicate the extremes of operation with respect to temperature of stage 2 of the thermostat means 10.

A temperature 60 is plotted with respect to time. It is initially shown as a slowly declining temperature from some higher level. A point 61 is reached at which the stage 1 thermostat section causes the heat pump to operate. This causes the temperature to rise to point 62 where the break of the thermostat stage 1 deenergizes the heat pump. This will continue to occur until a point 63 where the heat pump is no longer able to satisfy the heating load in the building. This point is labeled as the "outdoor temperature above the balance point". To the right is the "outside temperature below the balance point". At the point 63 it is apparent that the temperature cannot reach the break point 1 of the first stage 30 of the thermostat means 10, and the temperature continues to fall at 64. The fall of the temperature eventually reaches the make point of the second stage thermostat as shown at 65. At this point, the second stage of the thermostat means and the fossil fuel furnace 22 becomes active. As will be seen in the later description of operation, at this point in time the heat pump stage is locked out.

When the fossil fuel furnace is operating the temperature rises at 66 rather sharply until it reaches point 67 where the break of the second stage deenergizes the fossil fuel furnace. The temperature then starts to fall in a normal manner at 70 and the system will repeat itself in operation. The fall at 70 can cause the heat pump to come on and the temperature rise at 71. If the heat pump is able to handle the load it will cycle exclusive of the fossil fuel furnace 22. If it is not able to handle the load, the fall is shown again at 72 to bring on the fossil fuel furnace at point 73. All of this operation will become apparent when the operation of the circuit of FIG. 1 is explained.

OPERATION

It is assumed that the temperature is above the control point for the thermostat means 10 as indicated at 60 in FIG. 2. At that time the first stage switch means 30 is tilted to the left (or counterclockwise) and the mercury 35 is at the end of the envelope 34 at the left thereby opening the circuit between the elements 36 and 38. The second stage switch means 31 is in the position shown in FIG. 1. As such, it will be apparent that the circuits to terminals 12 and 13 are both open circuited and neither the heat pump nor the fossil fuel furnace 22 is activated.

As the temperature 60 continues to fall and reaches the point 61 of FIG. 2, the first stage switch means 30 tips clockwise and the mercury 35 provides an electric circuit between elements 38 and 36 so that a circuit is completed to energize the heat pump 21. That circuit is from the terminal 12, through the heat anticipator 53, the first stage switch means 30, and the conductor 52. The conductor 52 completes a circuit through the mercury 42 and the elements 45 and 43 to the conductor 51 which allows a circuit to be completed to the terminal 11. This circuit then can be traced through the power source or transformer 14, the terminal 15, the conductor 16, and the conductor 18 back through the heat pump 21 to the terminal 12. As such, the heat pump is energized but the circuit to the fossil fuel furnace 22 is open circuited because the switch means 31 is in the position shown in FIG. 1. If the heat pump 21 satisfies the heating load, the switch means 30 will tip counterclockwise, and will open circuit the conductor to the terminal 12 thereby dropping out the heat pump. This situation will continue as long as the heat pump is capable of handling the load.

In the event that the heat pump alone is not able to handle the load, as at point 63 in FIG. 2, the first stage switch means 30 will be in the position shown in FIG. 1 and the second stage switch means 31 will tip clockwise thereby allowing the mercury 42 to complete a circuit between the elements 43 and 44 to complete a circuit to the terminal 13. In this case, the tipping of the switch means 31 clockwise open circuits the conductor 52 to the first stage switch means 30 thereby immediately deenergizing the heat pump 21. The tipping of the switch means 31 clockwise completes an electric circuit from the terminal 13 through the anticipator 54, the elements 44 and 43, and the conductor 51 to the transformer 14. From the transformer 14 a circuit is completed through the conductor 16 to the conductor 20 and the fossil fuel furnace 22. This completes a circuit to energize the fossil fuel furnace 22 whenever the heat pump 21 is deenergized.

Upon the load being satisfied, as at point 67 of FIG. 2, the switch means 31 tips in a counterclockwise direction thereby opening the circuit between the elements 44 and 43. This reestablishes a control circuit for the first stage switch means 30 in the event that the temperature falls, as is shown at 70 of FIG. 2. When the temperature falls sufficiently, the switch means 30 tips clockwise and reinitiates the operation of the heat pump 21. At this time the fossil fuel furnace is out of the circuit. If the heat pump can handle the load, it will continue to cycle. If it cannot handle the load, the second stage switch means will tip clockwise and will reenergize the fossil fuel furnace at the same time it deenergizes the heat pump 21.

It can be seen from this disclosure that a very simple two-stage thermostat means having a single pole switch means connected to the first stage, and a single pole, double throw switch means connected in the second stage can control a heat pump and a fossil fuel furnace. This can be accomplished without the need of any resort to a connection external of the heated area to the heat pump for sensing or control purposes. This substantially reduces the cost of the installation of an add-on type of heat pump installation, and makes the unit more efficient. The installation requires less critical adjustments of any outdoor control equipment that is normally provided with a heat pump since the thermostat means 10 is completely independent of the heat pump operating equipment itself. Also, this eliminates installer's errors or misjudgments in the balance point for the heat pump.

The present invention has been disclosed as a bimetal operated mercury switch arrangement. It is obvious that other types of temperature responsive switch means could be used as long as the switching sequences of the present invention are adhered to. As such, the inventor wishes to be limited in the scope of his invention solely by the scope of the appended claims.

The embodiments of the invention in which an exclusive property or right is claimed are depicted as follows:

1. A thermostat to control the heating of a space with said thermostat adapted to be connected to control a furnace and a heat pump wherein the output heat from said furnace passes through a portion of said heat pump, including: two-stage thermostat means with a first stage including single pole switch means having a temperature control range smaller than a temperature control range of a second stage of said thermostat means; both of said stages being responsive to a temperature within said space to be heated; said switch means having contacts which are open circuited upon a temperature rise and closed circuited upon a temperature drop within said first stage temperature control range; said second stage having single pole, double throw switch means with said second stage switch means having contacts operated between open and closed positions on temperature changes within said second stage temperature control range; internal thermostat circuit means connecting said first stage switch means to said second stage switch means to allow said thermostat to complete a first electric circuit through said two switch means upon said first stage sensing a temperature drop to a limit of said first stage temperature range; said second stage switch means opening said first electric circuit and completing a second electric circuit upon a sufficient temperature drop; and terminal means connected to said two thermostat circuits with said terminal means adapted to connect said thermostat to said heat pump and said furnace; said heat pump and said furnace being controlled so that they can not operate at the same time.

2. A thermostat as described in claim 1 wherein said two-stage thermostat means includes bimetal means to operate said switch means.

3. A thermostat as described in claim 2 wherein each of said switch means is a mercury switch.

4. A thermostat as described in claim 3 wherein said bimetal means includes separate bimetals for operation of each of said mercury switches.

5. A thermostat as described in claim 1 wherein said internal thermostat circuit means includes heat anticipation means.

6. A thermostat as described in claim 5 wherein said heat anticipation means includes two separate heat anticipation means with each of said separate heat anticipation means associated with and affecting the control of one of said two stages.

7. A thermostat as described in claim 6 wherein each of said separate heat anticipation means are resistance type heaters.

8. A thermostat as described in claim 7 wherein said two-stage thermostat means includes bimetal means to operate said switch means.

9. A thermostat as described in claim 8 wherein each of said switch means is a mercury switch.

10. A thermostat as described in claim 9 wherein said bimetal means including separate bimetals for operation of each of said mercury switches.

* * * * *